(12) United States Patent
Shin et al.

(10) Patent No.: US 10,066,092 B2
(45) Date of Patent: Sep. 4, 2018

(54) COMPOSITION COMPRISING AT LEAST TWO KINDS OF RESIN AND GLASS FIBER, AND PALLET MANUFACTURED FROM THE SAME

(71) Applicant: KOREA PALLET POOL CO., LTD., Seoul (KR)

(72) Inventors: Yang Jai Shin, Seoul (KR); Yun Suk Cho, Kyonggi-do (KR)

(73) Assignee: KOREA PALLET POOL CO., LTD., Seoul (KR)

( * ) Notice: Subject to any disclaimer, the term of this patent is extended or adjusted under 35 U.S.C. 154(b) by 741 days.

(21) Appl. No.: 14/382,714

(22) PCT Filed: Feb. 3, 2014

(86) PCT No.: PCT/KR2014/000907
§ 371 (c)(1),
(2) Date: Sep. 3, 2014

(87) PCT Pub. No.: WO2015/005556
PCT Pub. Date: Jan. 15, 2015

(65) Prior Publication Data
US 2016/0237262 A1    Aug. 18, 2016

(30) Foreign Application Priority Data

Jul. 12, 2013 (KR) .................. 10-2013-0082279
Jan. 29, 2014 (KR) .................. 10-2014-0011170

(51) Int. Cl.
| | |
|---|---|
| C08L 23/06 | (2006.01) |
| C08L 23/08 | (2006.01) |
| C08L 23/12 | (2006.01) |
| C08L 21/00 | (2006.01) |
| C08L 23/04 | (2006.01) |
| C08J 3/20 | (2006.01) |
| C08J 5/04 | (2006.01) |
| C08L 23/10 | (2006.01) |

(52) U.S. Cl.
CPC ............. *C08L 23/06* (2013.01); *C08J 3/203* (2013.01); *C08J 5/043* (2013.01); *C08L 21/00* (2013.01); *C08L 23/04* (2013.01); *C08L 23/10* (2013.01); *C08L 23/12* (2013.01); *C08J 2321/00* (2013.01); *C08J 2323/06* (2013.01); *C08J 2323/12* (2013.01); *C08J 2409/06* (2013.01); *C08J 2423/06* (2013.01); *C08L 2205/02* (2013.01); *C08L 2205/03* (2013.01); *C08L 2205/035* (2013.01); *C08L 2207/066* (2013.01); *C08L 2207/20* (2013.01); *C08L 2555/34* (2013.01)

(58) Field of Classification Search
CPC .......... C08L 23/06; C08L 21/00; C08L 23/12; C08L 23/08
USPC ................................................. 524/101, 494
See application file for complete search history.

(56) References Cited

U.S. PATENT DOCUMENTS

| | | | |
|---|---|---|---|
| 5,660,770 A | 8/1997 | Wernicke et al. | |
| 6,756,412 B2 * | 6/2004 | Muzzy | ............. B29B 17/0042 264/37.1 |
| 2003/0087973 A1 * | 5/2003 | Muzzy | ............. B29B 17/0042 521/48 |
| 2012/0065306 A1 * | 3/2012 | Goda | ............. C08J 5/043 524/101 |

FOREIGN PATENT DOCUMENTS

| | | |
|---|---|---|
| JP | 2847300 | 1/1999 |
| JP | 2000-203578 | 7/2000 |
| KR | 10-2004-0029566 | 4/2004 |
| KR | 10-0617590 | 9/2006 |
| KR | 10-2010-0075227 | 7/2010 |

OTHER PUBLICATIONS

International Search Report dated May 20, 2014 for PCT/KR2014/000907.
Written Opinion of the International Search Report dated May 20, 2014 for PCT/KR2014/000907.
Office Action dated Jul. 13, 2017 corresponding to European Patent Application No. 14755961.1, 4 pages.

* cited by examiner

*Primary Examiner* — Deve E Valdez
(74) *Attorney, Agent, or Firm* — Rabin & Berdo, P.C.

(57) ABSTRACT

Provided is a composition containing two or more resins and a long glass fiber, containing: a resin mixture including two or more unit resins; a long glass fiber with a length of 10 mm or greater; and a rubber-based resin, which contains 3-30 parts by weight of the long glass fiber and 0.5-25 parts by weight of the rubber-based resin based on 100 parts by weight of the resin mixture.

2 Claims, 4 Drawing Sheets

COMPOSITION COMPRISING AT LEAST TWO KINDS OF RESIN AND GLASS FIBER, AND PALLET MANUFACTURED FROM THE SAME

This application claims the priority of Korean Patent Application No. 10-2013-0082279, filed on Jul. 12, 2013 in the KIPO (Korean Intellectual Property Office), the disclosure of which is incorporated herein entirely by reference. Further, this application is the National Stage application of International Application No. PCT/KR2014/000907, filed Feb. 3, 2014, which designates the United States and was published in Korean. Each of these applications is hereby incorporated by reference in their entirety into the present application.

TECHNICAL FIELD

The present disclosure relates to a composition containing two or more resins and a glass fiber, more particularly to a composition containing two or more resins and a long glass fiber which is capable of improving impact resistance and flexural property of waste resins and plastic products.

BACKGROUND ART

Waste resins are separated, pulverized and melted for recycling. However, since the polymer-based waste resins have very different physical properties depending on their kinds, it is necessary to accurately separate the various kinds of waste resins.

In general, waste resins are separated based on difference in specific gravity. However, it is not easy to separate polyethylene (PE) and polypropylene (PP) with this method because their specific gravities are lower than that of water. If resins with different physical properties are used together without being accurately separated, physical properties such as impact resistance may be degraded due to poor compatibility and affinity between the resins.

Korean Utility Model Application No. 20-2001-24176 discloses a method for preparing a pallet using a recycled plastic. However, since the recycled pallet of the cited invention is prepared from pulverized waste resin materials, it has poor impact resistance due to low compatibility and affinity between the different waste resin materials.

DISCLOSURE OF THE INVENTION

Technical Problem

The present disclosure is directed to providing a composition containing two or more waste resins, which exhibits improved physical properties such as impact resistance, flexural strength, etc., and a plastic product using the same.

Technical Solution

To solve the above object, the present disclosure provides a composition comprising two or more resins and a long glass fiber, comprising: a resin mixture comprising two or more unit resins; a long glass fiber with a length of 10 mm or greater; and a rubber-based resin, wherein the composition comprises 3-30 parts by weight of the long glass fiber and 10-50 parts by weight of the rubber-based resin based on 100 parts by weight of the resin mixture.

In another aspect of the present disclosure, the composition further comprises 10-35 parts by weight of LDPE and the LDPE is included in the composition after being impregnated in the rubber-based resin in pellet form.

In another aspect of the present disclosure, the resin mixture comprises waste polyethylene (PE) and waste polypropylene (PP).

In another aspect of the present disclosure, a plastic product comprising the composition is provided.

In another aspect of the present disclosure, the present disclosure provides a method for preparing a plastic product using the composition comprises: preparing the composition; melting the prepared composition; and molding the melted composition into a plastic product.

In another aspect of the present disclosure, the prepared composition comprises LDPE included in the composition after being impregnated in the rubber-based resin in pellet form.

Advantageous Effects

In the present disclosure, a long glass fiber with a length of a predetermined length or greater is bound to two or more waste resins to improve physical affinity and flexural property of unit resins. Also, a rubber-based resin, etc. are used to greatly improve impact resistance and compatibility. In addition, an LDPE-containing rubber-based resin is used to improve dispersibility of the long glass fiber in the waste resin and to maximize improvement in strength by the long glass fiber.

MODE FOR CARRYING OUT THE INVENTION

Figure 1:
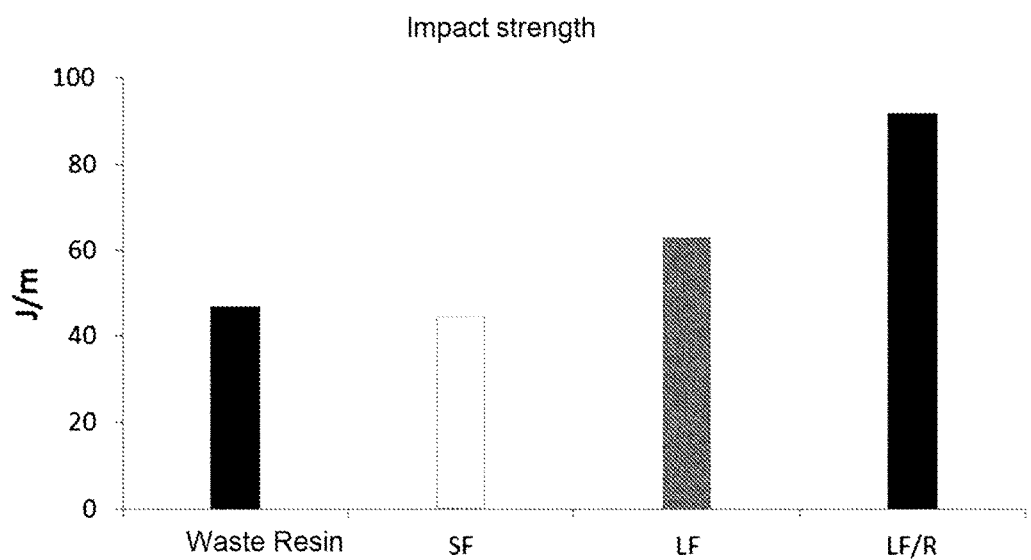
FIGS. 1 and 2 respectively show impact strength and flexural strength test results of molded products (pallets) prepared by mixing a 5:5 or 2:8 resin mixture of PP and PE with long glass fibers of different lengths followed by melting and molding.

Hereinafter, the present disclosure will be described in detail referring to the accompanying drawings. The following exemplary embodiments are provided to fully convey the present disclosure to those skilled in the art. Accordingly, the present disclosure is not limited by the exemplary embodiments but may be embodied in different forms. In the drawings, the width, length, thickness, etc. may be exaggerated for the sake of convenience. Throughout the description, like reference numerals denote like elements. Unless specified otherwise, the acronyms used in the description should be interpreted as commonly used and understood by those skilled in the art.

In an aspect, the present disclosure provides a composition containing a mixture of two or more waste resins and a long glass fiber with a predetermined length (10 mm or greater).

In an exemplary embodiment of the present disclosure, unit resins of the two or more waste resins may be polyethylene (PE) and polypropylene (PP) whose specific gravities are lower than that of water. The two resins are used and discarded waste resins. The present disclosure solves the problems occurring when two or more waste resins with different structures, physical properties and molecular weights are used together due to poor compatibility, i.e., poor brittleness, impact resistance, flexural strength, etc., by using a long glass fiber with a predetermined length or greater and a rubber-based resin.

In an exemplary embodiment of the present disclosure, the composition may be a composition for preparing a molded plastic product such as a pallet and may contain a resin mixture including two or more unit resins, a long glass fiber with a length of 10 mm or greater and a rubber-based resin.

In an exemplary embodiment of the present disclosure, the resin mixture includes unit resins of waste polyethylene (PE) and waste polypropylene (PP). The unit resins may have the same molecular weights as those of commonly used PE and PP. Since the unit resins of the resin mixture have specific gravities lower than 1, it is difficult to separate the resins PE and PP based on the difference in specific gravity from water. As the different resins are used together, compatibility and chemical affinity between the resins are low due to difference in chain length, structure, branching type, etc. As a result, the molded product prepared from the resin mixture may be broken easily due to external impact.

In the present disclosure, the long glass fiber of a predetermined length is physically mixed before the melting, so that the long glass fiber can serve as a kind of main chain to which the unit resins of the resin mixture bind. As such, the two different unit resins bind to the long glass fiber and the long glass fiber serves to connect the two unit resins.

The inventors of the present disclosure have noted that the long glass fiber connecting different waste resins exhibits different effect depending on its length and that use of a rubber-based resin such as SBR, EPDM, SEBS, SBS, etc. can lead to significant improvement in impact resistance while maintaining flexural strength.

Figure 2:
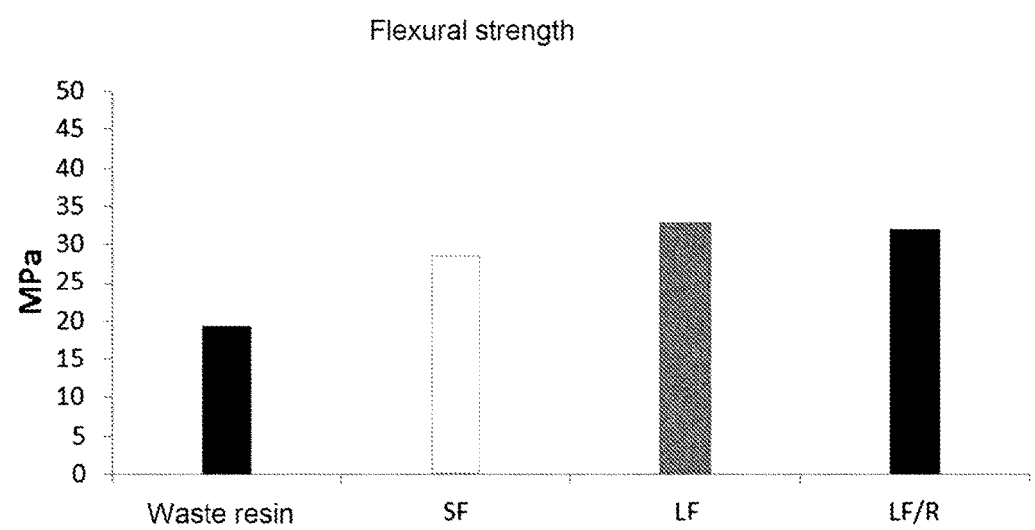

FIGS. 1 and 2 respectively show impact strength and flexural strength test results of molded products (pallets) prepared by mixing a 5:5 or 2:8 (weight ratio) resin mixture of PP and PE with long glass fibers (10 parts by weight) of different lengths followed by melting and molding.

In FIGS. 1 and 2, Waste resin is for the chase where no long glass fiber is used, SF is for the chase where a short glass fiber with a length of 1 mm or smaller is used, LF is for the chase where a long glass fiber with a length of 10 mm or greater is used, and LF/R is for the chase where a long glass fiber with a length of 10 mm or greater and a rubber-based resin are used.

Referring to FIGS. 1 and 2, it can be seen that, when a short glass fiber is used, flexural strength is slightly increased but impact strength decreases as compared to when no long glass fiber is used.

In contrast, when a long glass fiber with a length of 10 mm or greater is used, not only flexural strength but also impact strength is increased remarkably.

In an exemplary embodiment of the present disclosure, the long glass fiber with a length of 10 mm or greater is included in an amount of 3-30 parts by weight and the rubber-based resin is included in an amount of 0.5-30 parts by weight, based on 100 parts by weight of the resin mixture. In an exemplary embodiment of the present disclosure, the long glass fiber may be prepared by rolling melted glass at high speed. A commercially available the long glass fiber with a length of 10 mm or greater may be used.

If the content of the long glass fiber is lower than the above-described range, because the effective length of the long glass fiber connecting the unit resins decreases, it cannot chemically bind to the unit resins sufficiently, leading to insufficient improvement in affinity. And, if the content is higher than the above-described range, moldability is lowered and weight increases because of decreased content of the resins.

If the content of the rubber resin in the composition is lower than the above-described range, impact resistance decreases. And, if the content is higher than the above-described range, moldability and flexural strength decrease.

In another exemplary embodiment, the present disclosure provides a composition containing a mixture of two or more waste resins, a long glass fiber with a predetermined length (10 mm or greater) and an LDPE-containing rubber-based resin.

In an exemplary embodiment of the present disclosure, the composition may be a composition for preparing a molded plastic product such as a pallet and may contain a resin mixture including two or more unit resins, a long glass fiber with a length of 10 mm or greater and a rubber-based resin containing LDPE (density: 0.915-0.925 g/cm3, weight-average molecular weight≥1,000,000). In particular, in the present disclosure, the LDPE having many side branches is previously included in the rubber resin and then mixed with the resin mixture including the two or more waste resins, in order to solve the problem of decreased dispersibility of the long glass fiber occurring when the long glass fiber is mixed with the melted resin and achieve uniform strength of the plastic product. The LDPE included in the rubber-based resin improves dispersibility of the long glass fiber and, as a result, improves strength of the finally obtained plastic product. The improvement of the dispersibility of the long glass fiber by the LDPE-containing rubber-based resin will be described in more in Test Examples. In an exemplary embodiment of the present disclosure, although the rubber-based resin may be either a non-olefin-based such as SBR, EPDM, SEBS, SBS, etc. or an olefin-based rubber resin such as an ethylene-butene copolymer.

In an exemplary embodiment of the present disclosure, the resin mixture includes unit resins of waste polyethylene (PE) and waste polypropylene (PP) as described above. The problem occurring when the waste resins with similar specific gravities are used together has been described above.

In an exemplary embodiment of the present disclosure, the long glass fiber with a length of 10 mm or greater is included in an amount of 3-30 parts by weight, the LDPE-containing rubber-based resin is included in an amount of 10-50 parts by weight and the LDPE is included in an amount of 10-35 parts by weight, based on 100 parts by weight of the resin mixture. If the content of the LDPE is lower than the above-described range, strength may not be uniform because of decreased dispersibility of the long glass fiber. And, if the content is higher than the above-described range, improvement in impact resistance by the rubber-based resin decreases. If the content of the long glass fiber is lower than the above-described range, because the effective length of the long glass fiber connecting the unit resins decreases, it cannot chemically bind to the unit resins sufficiently, leading to insufficient improvement in affinity. And, if the content is higher than the above-described range, moldability is lowered and weight increases because of decreased content of the resins. If the content of the rubber resin is lower than the above-described range, impact resistance decreases. And, if the content is higher than the above-described range, moldability and flexural strength decrease.

FIGS. 1 and 2 respectively show impact strength and flexural strength test results of molded products (pallets) prepared by mixing a 5:5 or 2:8 (weight ratio) resin mixture of PP and PE with long glass fibers (10 parts by weight) of different lengths followed by melting and molding.

In FIGS. 1 and 2, Waste resin is for the chase where no long glass fiber is used, SF is for the chase where a short glass fiber with a length of 1 mm or smaller is used, LF is for the chase where a long glass fiber with a length of 10 mm or greater is used, and LF/R is for the chase where a long glass fiber with a length of 10 mm or greater and a rubber-based resin are used.

Referring to FIGS. 1 and 2, it can be seen that, when a short glass fiber is used, flexural strength is slightly increased but impact strength decreases as compared to when no long glass fiber is used.

In contrast, when a long glass fiber with a length of 10 mm or greater is used, not only flexural strength but also impact strength is increased remarkably.

After mixing a rubber-based resin (SBR, 10 parts by weight) containing LDPE (10 parts by weight) with a resin mixture and a long glass fiber in pellet form, the resulting mixture was melted. When the LDPE-containing rubber-based resin was used, the dispersibility of the long glass fiber in the resin mixture was remarkably improved.

Figure 3:
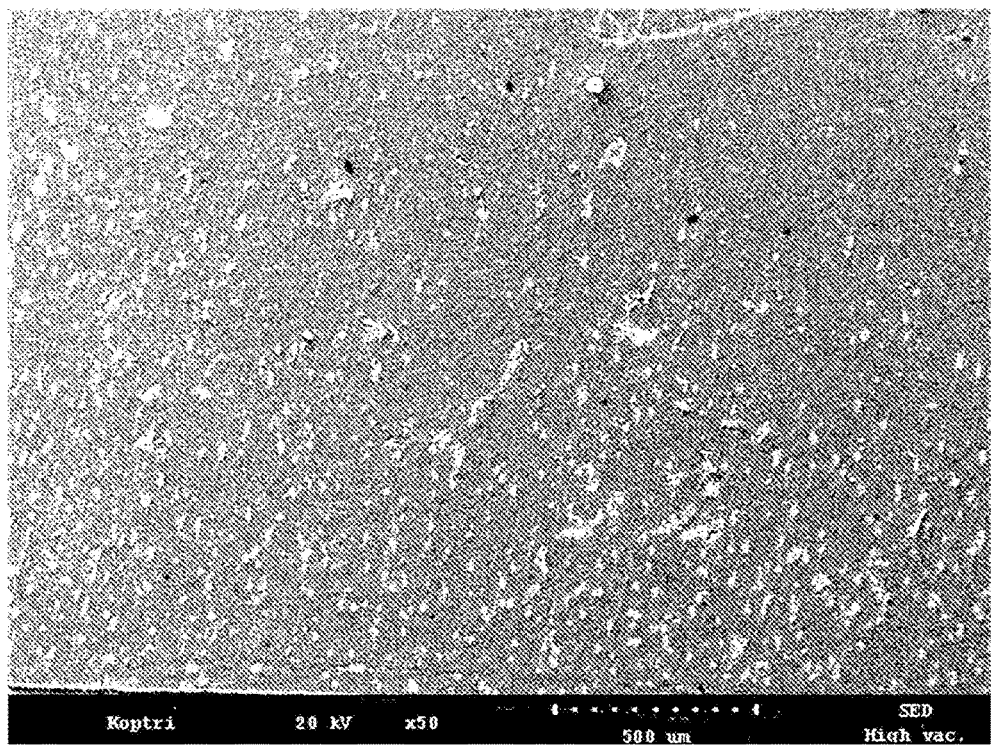
FIGS. 3 and 4 show SEM images of a molded product prepared using a composition containing a rubber-based resin only and FIGS. 5 and 6 show SEM images of a molded product prepared using a composition containing an LDPE-containing rubber-based resin.
Figure 4:
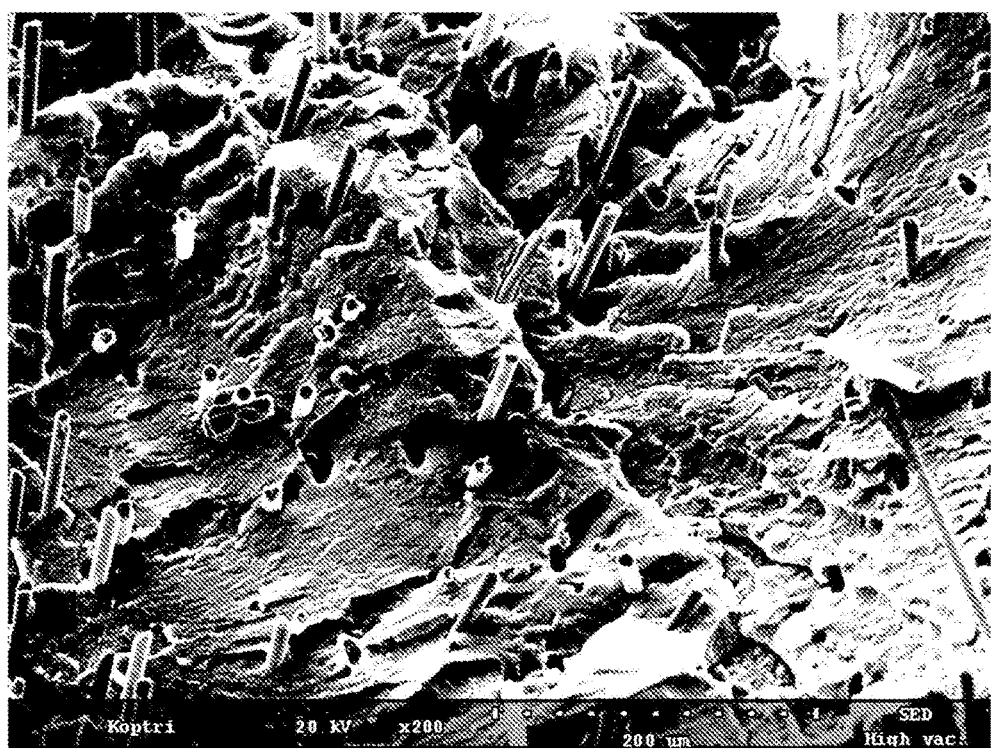
Figure 5:
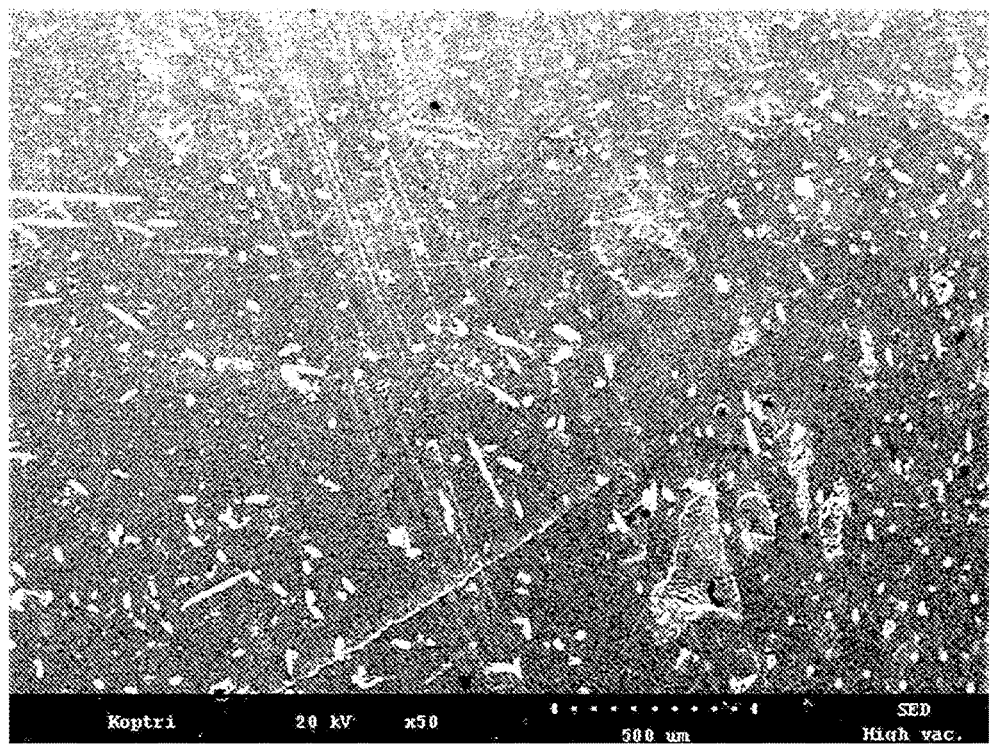
Figure 6:
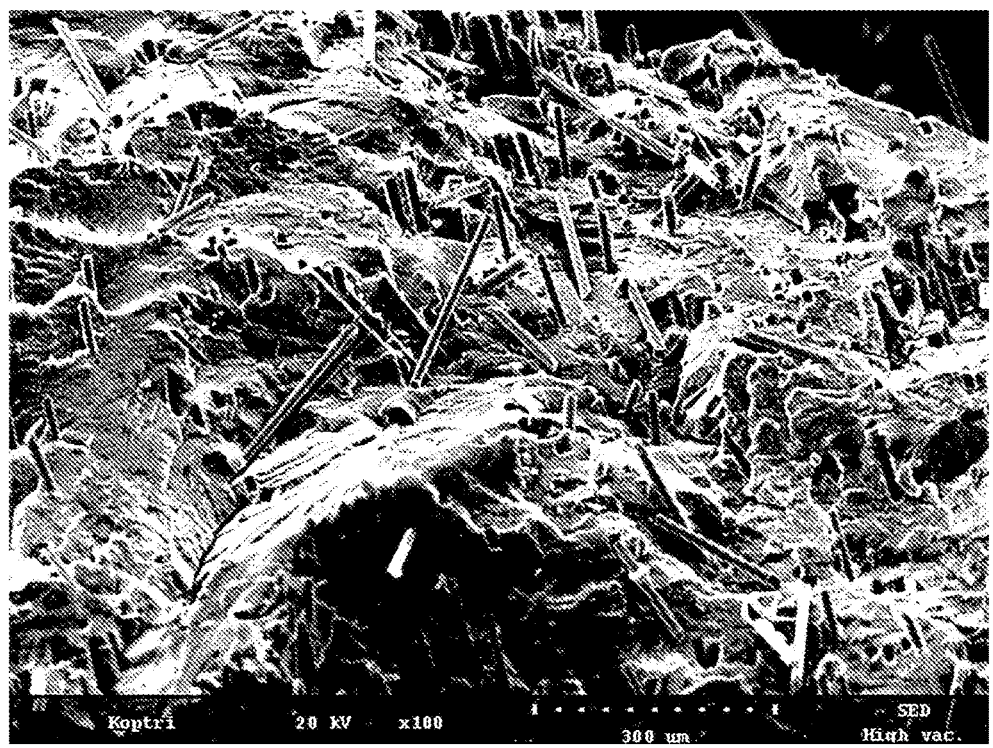

FIGS. 3 and 4 show SEM images of a molded product prepared using a composition containing a rubber-based resin only and FIGS. 5 and 6 show SEM images of a molded product prepared using a composition containing an LDPE-containing rubber-based resin.

Referring to FIGS. 3-6, when only the rubber-based resin was added to the melted resin, the long glass fiber was not uniformly dispersed (see FIG. 3) and, as a result, voids were observed in the cross-section (see FIG. 4). In contrast, when the LDPE-containing rubber-based resin was added to the melted resin in pellet form, the long glass fiber was uniformly dispersed (see FIG. 5) and fewer voids were formed in the composition (see FIG. 6).

Accordingly, it can be seen that the addition of the LDPE-containing rubber-based resin allows uniform dispersion of the long glass fiber in the resin, thereby improving impact strength and flexural strength.

The present disclosure also provides a plastic product prepared using the above-described composition and having improved strength, flexural strength, etc. The composition according to the present disclosure may be used to prepare various products that can hold articles and endure load, such as pallets, crates and boxes.

Figure 7:
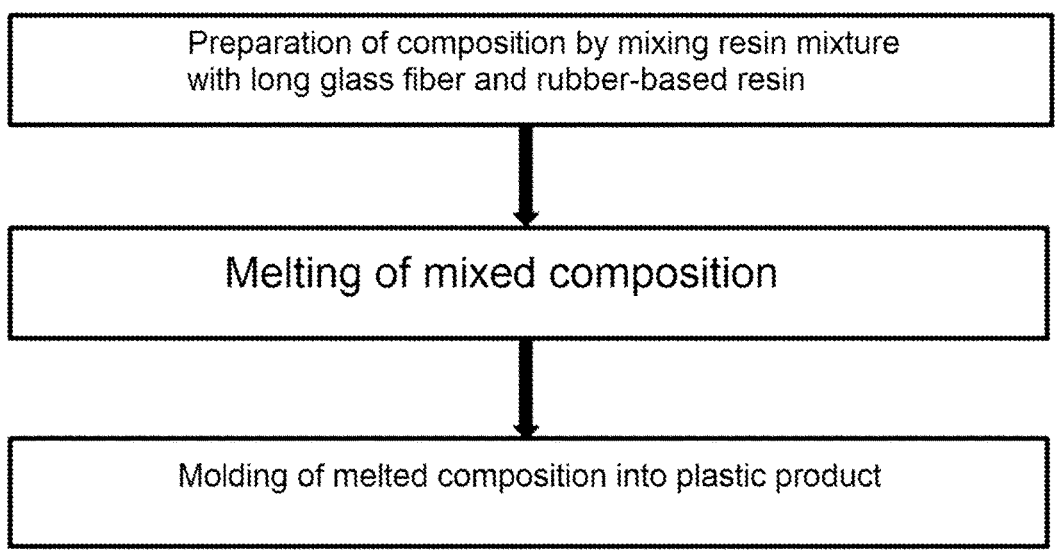
FIG. 7 describes a procedure of preparing a plastic product according to an exemplary embodiment of the present disclosure.

FIG. 7 describes a procedure of preparing a plastic product according to an exemplary embodiment of the present disclosure.

Referring to FIG. 7, a composition is prepared by mixing a resin mixture, a long glass fiber and, optionally, an LDPE-containing rubber-based resin as described above. The LDPE is included in the composition after being impregnated in the rubber-based resin in pellet form.

As described above, the use of LDPE leads to remarkably improved dispersibility of the long glass fiber.

Subsequently, the mixed composition is melted and the melted composition is molded into a plastic product. In an exemplary embodiment of the present disclosure, the molding may be achieved by injection molding but is not limited thereto.

As described above, the present disclosure greatly improves the affinity and compatibility between the unit resins of the waste resin with different structures and physical properties by connecting them with the long glass fiber of a predetermined length and also remarkably improves impact resistance and flexural property using the rubber-based resin. In addition, it improves dispersibility by using the LDPE-containing rubber-based resin wherein the LDPE has superior compatibility in the PE resin of the waste resin and fixes the long glass fiber with side branches. As a result, the effect of strength improvement by the long glass fiber is maximized. Also, by including the LDPE-containing rubber-based resin with the two or more waste resins in pellet form prior to the molding, the problem of deposition of the rubber-based resin on the surface of the plastic product can be solved.

The above-described exemplary embodiments are given only for the purpose of illustration and those skilled in the art will appreciate that the conceptions and specific embodiments disclosed in the foregoing description may be readily utilized as a basis for modifying or designing other embodiments for carrying out the same purposes of the present disclosure. Accordingly, those skilled in the art will also appreciate that the scope of the present disclosure is not limited by the exemplary embodiments.

INDUSTRIAL APPLICABILITY

The present disclosure also provides a plastic product prepared using the above-described composition and having improved strength, flexural strength, etc. The composition according to the present disclosure may be used to prepare various products that can hold articles and endure load, such as pallets, crates and boxes.

The invention claimed is:

1. A composition comprising two or more resins and a long glass fiber, the composition comprising:
   a resin mixture comprising waste polyethylene (PE) and waste polypropylene (PP);
   a long glass fiber with a length of 10 mm or greater;
   a rubber-based resin; and
   an LDPE impregnated in the rubber-based resin in pellet form,
   wherein the composition comprises 3-30 parts by weight of the long glass fiber and 10-50 parts by weight of the rubber-based resin, and 10-35 parts by weight of LDPE based on 100 parts by weight of the resin mixture,
   wherein the LDPE is included in the composition after being impregnated in the rubber-based resin in pellet form, and has a density of 0.915 to 0.925 $g/cm^3$ and weight average molecular weight of 1 million or greater.

2. A plastic product comprising the composition of claim 1.

* * * * *